US006658557B1

United States Patent
McCoy et al.

(10) Patent No.: US 6,658,557 B1
(45) Date of Patent: Dec. 2, 2003

(54) SYNTHESIZING THE INSTRUCTION STREAM EXECUTED BY A MICROPROCESSOR FROM ITS BRANCH TRACE DATA

(75) Inventors: Jody A. McCoy, Austin, TX (US); Michael L. Choate, Round Rock, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/578,953

(22) Filed: May 25, 2000

(51) Int. Cl.[7] .............. G06F 9/54; G06F 11/00; G06F 11/25
(52) U.S. Cl. ............ 712/227; 712/226; 714/15; 714/38; 714/39; 714/45
(58) Field of Search ................ 714/38, 39, 37, 714/20, 45, 15; 710/22; 712/28, 29, 31, 227, 245, 226, 233; 717/128, 127; 711/112

(56) References Cited

U.S. PATENT DOCUMENTS

| | | | |
|---|---|---|---|
| 3,659,272 A | 4/1972 | Price et al. ............. 714/45 |
| 4,349,873 A | 9/1982 | Gunter et al. ............. 710/269 |
| 4,445,177 A | 4/1984 | Bratt et al. ............. 712/245 |
| 4,870,573 A | 9/1989 | Kawata et al. ............. 714/38 |
| 5,019,967 A | 5/1991 | Wheeler et al. ............. 712/219 |
| 5,367,550 A | 11/1994 | Ishida ............. 714/38 |
| 5,379,301 A | 1/1995 | Sato et al. ............. 714/38 |
| 5,485,574 A | 1/1996 | Bolosky et al. ............. 714/35 |
| 5,564,028 A | 10/1996 | Swoboda et al. ............. 712/227 |
| 5,574,892 A | 11/1996 | Christensen ............. 703/28 |
| 5,751,735 A | 5/1998 | Tobin et al. ............. 714/733 |
| 5,933,626 A | 8/1999 | Mahalingaiah et al. ............. 712/227 |
| 5,996,092 A | * 11/1999 | Augsburg et al. ............. 714/38 |
| 6,145,099 A | * 11/2000 | Shindou ............. 714/37 |

OTHER PUBLICATIONS

Sites et al., "Multiprocessor Cache Analysis Using ATUM," © 1988 IEEE, 9 pgs.

* cited by examiner

Primary Examiner—Daniel H. Pan
(74) Attorney, Agent, or Firm—Meyertons, Hood, Kivlin, Kowert & Goetzel, P.C.; B. Noël Kivlin

(57) ABSTRACT

A system for capturing the data necessary for synthesizing an instruction stream for a microprocessor. An embodiment uses a microprocessor that is adapted to write its branch trace data to the main memory. This branch trace data includes whether the microprocessor took each conditional jump encountered during the execution of a program as well as the target location of each indirect jump. The preferred embodiment further includes a logic analyzer coupled to the primary expansion bus of the target computer system. The logic analyzer captures input/output reads and writes as well as DMA transactions to the main memory. Finally, a synthesis control card controls starting a data capture as well as facilitating the transfer of information from buffers in the main memory to the control computer system. Using this information, a user may reconstruct the instruction steam as actually executed during a particular run of a program which may aide the user in performance analysis and design improvements for microprocessors.

20 Claims, 1 Drawing Sheet

SYNTHESIZING THE INSTRUCTION STREAM EXECUTED BY A MICROPROCESSOR FROM ITS BRANCH TRACE DATA

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to the instruction stream executed by a microprocessor. More particularly, the invention relates to recreating an actual instruction stream executed by a microprocessor in part by using the microprocessor's branch trace data. More particularly still, the invention relates to capturing branch trace data, input/output reads and writes, and direct memory access transactions to recreate an actual instruction stream executed by the microprocessor.

2. Background of the Invention

Computer programs are typically written in various high level programming languages. For example, a program may be written in C, C++, Fortran, Cobal or any other of a vast array of programming languages optimized for specific applications. However, computer systems do not directly execute the instructions written in these high level languages; rather, each of these languages must be compiled. Compiling involves taking the text file in a particular language and creating a series of instructions, in binary format, that are executable by the microprocessor. However, the instructions executed by the microprocessor are not as simplistic or straightforward as a particular programming language may imply. For example, a simple C or C++ instruction may be:

if (variable_1> variable_2) {[perform some task]}

In a C or C++ language, this instruction simply says that if variable_1 is greater than variable_2, perform the task within the brackets. However, for a microprocessor to make the determination takes significantly more steps than the simple 'if' statement implies. For example, the 'if' statement above may result in at least the following functions performed by the microprocessor, expressed in assembly language format:

| | |
|---|---|
| mov AX, variable_1 | ; move variable_1 to AX register |
| mov BX, variable_2 | ; move variable_2 to BX register |
| cmp AX, BX | ; compare these two |
| JA [some location] | ; jump if greater than |

Thus, it is the compiler's job to translate from the human readable programming language to machine language and also to implement the shorthand notation of the programming language into steps that may be performed by the microprocessor.

Using de-compilers or the like, it is possible to de-compile executable programs to determine the series of instructions executed by a microprocessor to perform some program, e.g. the 'if' statement as described above. However, executable programs, particularly in machine language form, contain many jumps and conditional jumps based on variables that may be known only during actual program execution. In other words, while one may be able to determine generally how a microprocessor steps through a particular program, including multiple jumps to various locations, the exact steps a microprocessor takes may not be determined because they may be based on real time variables generated or created during execution.

Consider, for example, a jump to a particular location. The microprocessor steps through various instructions and then comes to the jump instruction which commands the microprocessor to jump to and continue executing at a non-contiguous program location. Jump commands can be direct jumps, meaning that the microprocessor jumps to a particular location in the program which is known in advance. Jumps can also be indirect jumps, meaning that the microprocessor is commanded to jump to a location whose address is stored in a register. The locations indicated by the register may be based on variables available only during an actual execution of a program. Thus, one attempting to de-compile the steps a microprocessor takes in executing a program cannot determine the sequence to which the microprocessor jumps by looking at the executable program alone.

Microprocessor instruction sets also include conditional jumps, meaning that the microprocessor jumps to a different location in the program based on the outcome of some mathematical calculation. A microprocessor may jump, for example, if variable in a register is larger than another variable. By looking only at the executable program, it may not be possible to determine whether a microprocessor jumps at this program location because the variables controlling the condition of the jump may be specific to the particular execution. Indeed, these variable may change from execution to execution.

Some microprocessor manufacturers design their microprocessors with the ability to output data relating to conditional jumps. That is, some microprocessors may have the ability to output information regarding whether they jumped or did not jump at a particular executable instruction. However, this information alone falls short of the information necessary to reconstruct or recreate the actual instruction stream.

Thus, what is needed in the art is a method to synthesize or reconstruct the actual instruction stream executed by a microprocessor including the target locations of indirect jumps and other execution specific variables.

SUMMARY OF THE INVENTION

The problems noted above are solved in large part by a method of synthesizing the instruction stream executed by the microprocessor which has several facets. The first facet is a microprocessor adapted to write branch instruction data. Specifically, the microprocessor has the ability to write or output whether a conditional jump was taken, the target location of an indirect jump, the value of the code segment (CS) and extended instruction pointer (EIP) registers when the microprocessor received an interrupt and the processor internal registers. The microprocessor preferably writes this information to a buffer in main memory. Further, a data capture device on the primary expansion bus captures all input/output (I/O) information and all direct memory access (DMA) transactions.

Finally, the method includes installing a memory dump device on a secondary expansion bus of the computer. Based on the assertion of a system management interrupt (SMI), system management mode (SMM) software dumps the entire contents of the main memory array to a control computer coupled to the test system through the memory dump device. Based on the memory dump information, the branch trace data generated by the microprocessor, the processor internal registers at the time of memory dump, and the I/O and DMA information captured by the logic analyzer, a user may recreate or synthesize the microprocessor instruction stream.

Broadly speaking, the invention contemplates a system capable of capturing data necessary for synthesizing an instruction stream comprising a target computer system having a microprocessor for which the instruction stream is to be synthesized, where the target system is adapted to capture branch trace data sufficient to reconstruct the instruction stream. The system also comprises a control computer system coupled to the target computer system, where the control computer system is adapted to control program execution in the target system and to download branch trace data from the target computer system.

The invention further contemplates a method of recreating an instruction stream for a microprocessor comprising writing branch trace data to buffers, capturing system memory images, capturing processor internal registers, capturing input/output (I/O) reads and writes, capturing direct memory access (DMA) transactions, and recreating an instruction stream executed by a microprocessor using the branch trace data, captured I/O reads and writes, and the captured DMA transactions.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

One embodiment of a system to synthesize an instruction stream comprises two major components, a target computer system 100 having a microprocessor for which an instruction stream needs to be synthesized, and a control computer system 200 to control collection of data that is needed for the synthesis process. The target computer system, in addition to typical computer system hardware and functionality, preferably has three adaptations to aide in synthesizing of the instruction stream executed by the target computer system's microprocessor. These three adapted systems comprise: 1) a microprocessor capable of writing its branch trace data to system main memory; 2) a logic analyzer preferably installed on the primary expansion bus for capturing input/output (I/O) data and direct memory access (DMA) transactions; and 3) a synthesis control card.

Figure 1:
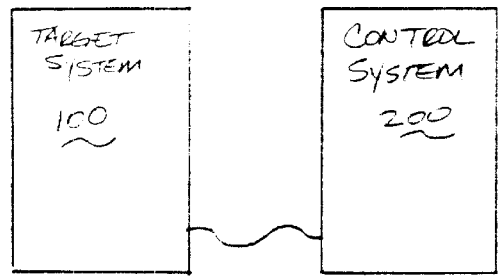
FIG. 1 shows a system for synthesizing the instruction stream executed by a microprocessor.

In broad but non-limiting terms, an embodiment is directed to gathering sufficient data related to the operation of a computer system such that the instruction stream executed by the microprocessor may be recreated, including indirect jumps and conditional jumps based on real time data that may change from execution to execution. More specifically, and referring to FIG. 1, an embodiment comprises two computer systems; a target computer system 100 and a control computer system 200. The control computer system 200 preferably controls the execution of the programs in the target computer system 100 including dumping main memory contents from the target computer system 100 to storage devices in the control computer system 200.

Figure 2:
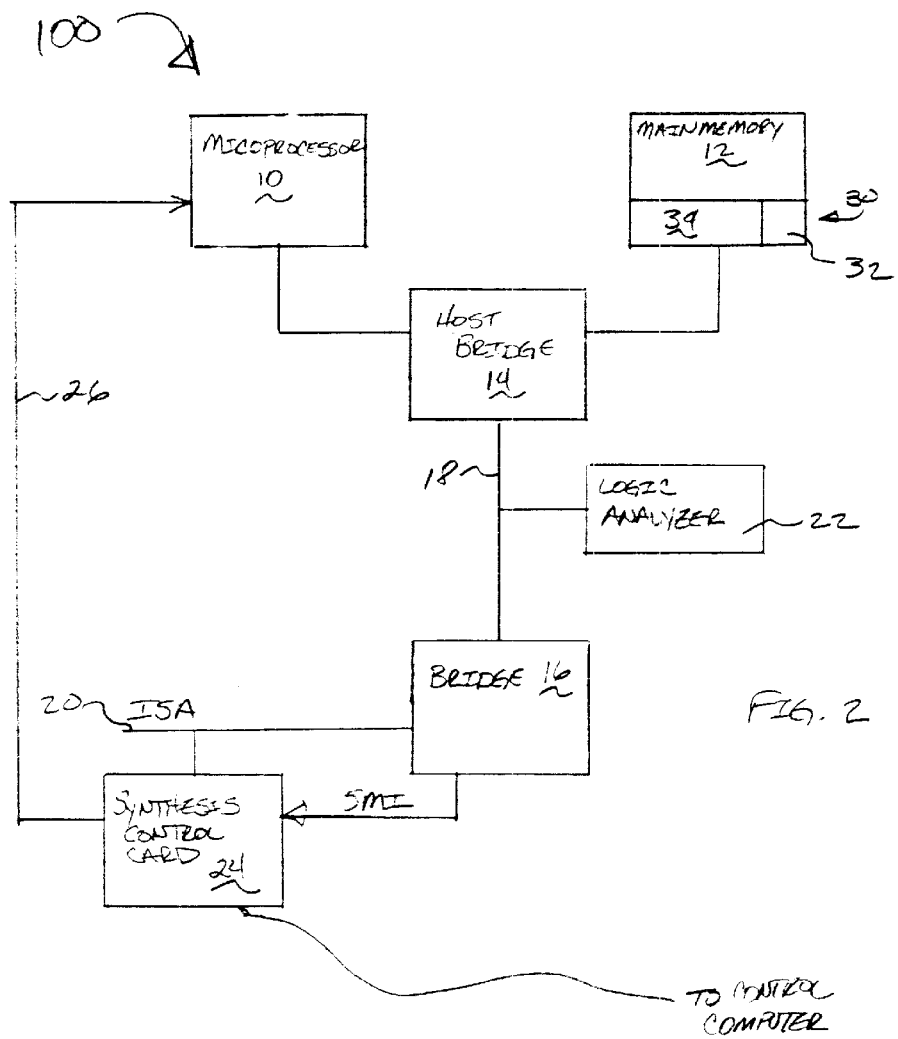
FIG. 2 shows an exemplary target system of the preferred embodiment.

As shown in FIG. 2, target computer system 100 contains a microprocessor 10 for which the instruction stream needs to be synthesized. While there may be many reasons for synthesizing an instruction stream for a microprocessor, the most common is to aide in refinement of microprocessor design, particularly with respect to improving benchmarking ratings. That is, understanding how a microprocessor executes instructions with real time data may aide microprocessor designers in designing microprocessors capable of better performance under standard benchmarking procedures, and thus better performance operating consumer applications.

The microprocessor preferably couples to main memory array 12 through a host bridge device 14. The main memory array 12 functions as the working memory for the microprocessor 10 and generally includes a conventional memory device or an array of memory devices in which programs, instructions and data are stored. Target computer system 100 also preferably comprises a second bridge logic device 16 that couples to the host bridge device 14 by way of a primary expansion bus 18. The second bridge logic device 16 bridges the primary expansion bus 18 to various secondary buses, including an ISA bus 20.

Preferably, the primary expansion bus 18 is a peripheral components interconnect (PCI) bus. However, implementation is not limited to a target system 100 having a PCI primary expansion bus 18. Indeed, the primary expansion bus 18 may comprise any suitable primary expansion bus that is now in existence, e.g. a Lightning Data Transfer (LDT) or Hub-Link bus, or any suitable bus that may be developed in the future.

Preferably, microprocessor 10 of the target system 100 has the ability to output its branch trace data. More specifically, microprocessor 10 is adapted to write to buffers 30, in main memory array 12, branch trace data. A description of what is written by the microprocessor 10 requires a brief digression into program flow in a microprocessor.

As mentioned in the Background section, steps or functions performed by a microprocessor while executing a program are not continuously sequential. That is, the microprocessor does not start at the beginning of a program and execute every step sequentially to the end. Rather, microprocessors perform the steps in sections of the program, and then branch or jump to other locations based on run time variables. Branching or jumping to other sections of the program is controlled by jump commands in the microprocessor's instruction set. There may be many possible jump commands that the microprocessor can execute. For example, in the 80386 instruction set there are at least twenty-seven jump commands which include, JE (jump if equal), JGE (jump if greater or equal), JNP (jump on no parity) and JNLE (jump if not less than or equal). Most of these jump commands are taken or not taken based on the status of registers within the microprocessor. These registers are preferably set by the execution of a mathematical functions, e.g. a compare command, prior to execution of the particular jump command. However, the variables of comparison are typically run time variables meaning that their values are not, or cannot, be determined until actual execution of the program. Also, the variables may have different values each time the program is executed. Therefore, de-compiling the program code reveals the existence of a particular jump command, but gives no indication of whether a program execution actually jumps because de-compilers cannot determine the run time variables.

In order to synthesize the instruction stream executed by a microprocessor of the target system 100, the microprocessor 10 preferably writes branch trace data to the main memory array 12. That is, each time the microprocessor 10 encounters one of the many jump commands in its instruction set, the microprocessor 10 preferably writes information to a buffer 30 in the main memory array 12. Preferably microprocessor 10 writes an indication to the buffer 30 of whether the jump command was taken. For example, a microprocessor 10 executing a program may encounter a JNO (jump on no overflow) instruction. If a previous mathematical function resulted in an overflow condition, an overflow register is set within the microprocessor. Upon encountering the JNO command, the microprocessor preferably writes to the buffer 30 in the main memory array 12 that the particular jump, in this exemplary case, was taken. Summarizing this aspect then, the microprocessor preferably 10 writes to the buffer 30 information regarding whether or not the microprocessor 10 performed a particular conditional jump.

In addition to conditional jumps, microprocessors also make jumps within program code to locations that are dynamically determined. More specifically, a microprocessor may jump to a particular location or may make an indirect jump. For example, consider the following assembly language instruction:

JMP [BX]

This particular jump instruction commands the microprocessor to resume execution of program code at the address indicated in the BX register. The contents of the BX register however are dynamic and may change from execution to execution. In order to synthesize the instruction stream executed by the microprocessor, the target location of such an indirect jump must be known. Therefore, the microprocessor 10 preferably writes the target location of each indirect jump to the buffer 30. Also, the microprocessor preferably writes the code segment (CS) and extended instruction pointer (EIP) to the buffer 30 each time other system components request, by means of generating an interrupt, the microprocessor perform some task.

Whether the microprocessor writes this information, and to which locations in main memory it is written, preferably depends on machines specific registers in the microprocessor 10. These registers are preferably written by x86 instructions to indicate that the branch trace data should be written, and to indicate the target location within the main memory array of such a buffer. One of ordinary skill in the art understands MSRs and could, now understanding their relationship to the disclosed embodiment, implement such functionality.

Having conditional jump information, indirect jump information and the CS and EIP at each interrupt is only part of the information required to recreate or synthesize the instruction stream. As was previously noted, microprocessor 10 preferably makes these conditional or direct jumps based on variables that may be stored in the main memory array 12. However, having the ability to synthesize or recreate the instruction stream requires capturing information that may affect these main memory variables. Computer operations such as input/output (I/O) read and writes as well as direct memory access (DMA) transactions affect storage locations in the main memory array 12, which therefore affects whether a microprocessor performs a conditional jump, and indirect jumps target locations. To address synthesis problems associated with I/O and DMA, an embodiment comprises a data capture device or logic analyzer 22 adapted to capture and store information exchanged in I/O reads and DMA transactions. More specifically, target system 100 preferably comprises a logic analyzer 22 coupled to the primary expansion bus 18. The logic analyzer monitors traffic on the primary expansion bus 18 and keeps copies of, for instruction stream reconstruction purposes, all I/O and DMA transactions. Preferably, logic analyzer 22 couples to the control computer 200 and downloads captured information thereto. With respect to I/O reads, the logic analyzer preferably stores these in a first-in-first-out (FIFO) buffer. Thus, in the reconstruction process, the first encounter of an input from I/O command executed by the microprocessor is easily related to the first input variable in the FIFO buffer. In similar fashion, the logic analyzer 22 monitors and captures copies of all DMA transactions to the main memory 12.

A further element of the target system 100 that facilitates synthesizing or recreating the instruction stream is a synchronization and control card 24 preferably coupled to the second bridge device 16 by way of the ISA bus 20. The synthesis and control card 24 preferably coordinates the transfer of the contents of the main memory array 12 to the control computer 200 at the beginning of a program execution for which the user desires to synthesize the instructions stream.

In operation then, a user takes two computer systems, a target system 100 and a control system 200. The target computer system 100 preferably has a microprocessor 10 that is capable of writing its branch trace data to a buffer 30 in the main memory array 12. The target computer system 100 also preferably has installed in it a logic analyzer 22, which captures I/O and DMA transactions, coupled to the primary expansion bus 18. The target computer system 100 also preferably comprises a synchronization card 24 coupled to a secondary expansion bus. By way of the synchronization card 24, the target computer system 100 preferably couples to the control computer system 200. The target computer system 100 is preferably booted with software that places a specialized SMM code in the system main memory. The microprocessor 10 preferably then begins execution of a program for which the user desires to reconstruct the instruction stream. Although this could be any program, it will most likely be a benchmarking program designed to determine the effective speed or other parameter of interest associated with the microprocessor 10. During execution of the program, a user instructs the synchronization card 24, by means of the control computer system 200, to begin data capture for reconstruction purposes. The synthesis control card 24 generates an SMI directly to the processor Responsive to this interrupt, execution of the benchmarking program preferably halts, in accordance with known microprocessor operation, and the SMM code executes. This SMM code preferably copies or dumps the entire contents of the main memory array 20 to the control computer system 200. The SMM code also preferably writes the machine specific registers (MSRs) in the microprocessor 10 to initiate the writing of branch trace data by the microprocessor 10.

After initialization completes, the microprocessor continues execution of the program for which the user desires to reconstruct the instruction stream. The buffer 30 in the main memory array 12 preferably comprises a series of memory locations used as a shift register 32. The microprocessor 10, in writing its branch trace data, preferably shifts asserted and non-asserted states into the shift register 32 as it executes conditional jump commands. For example, the microprocessor may write a logic 1 to the shift register 32 if, upon execution of an conditional jump, the condition is met and the microprocessor jumps. Likewise, the microprocessor may write a logic 0 on a subsequent jump indicating that the condition was not met and the microprocessor continued executing the program steps sequentially.

Buffer 30 also preferably comprises a buffer 34. In writing its branch trace data, the microprocessor preferably writes the target location of each indirect jump to buffer 34. Also, buffer 34 preferably stores the CS and EIP registers on each interrupt serviced by the microprocessor 10.

Concurrently with the microprocessor 10 executing the program instructions and writing branch trace data to the main memory array 12, the logic analyzer 22 coupled to the primary expansion bus 18 captures and copies each I/O read and write and DMA transaction.

When the buffer 30 in the main memory array 12 fills with branch trace data, an internal interrupt issues to the microprocessor halting execution of the test program. Preferably, the synthesis control card 24 then supervises the transfer of information from the buffer 30 in the main memory array to the control computer system 200. Likewise, logic analyzer 22 preferably issues the SMI interrupt when buffers on the logic analyzer card near storage capacity.

A user thus wanting to reconstruct the instruction stream now has available the entire main memory array contents at the start of execution, the processor registers and an indication of whether or not the microprocessor 10 took conditional jumps, the target location of each jump (in the order in which the jumps were encountered in the program) as well as all I/O reads, and DMA transactions performed during the data capture mode. Using this information, the entire instruction stream as actually executed during the test run may be reconstructed. Likewise, a user may execute the information on a software model of the microprocessor. Using this information, a microprocessor could, for example, optimize the microprocessor design for the particular instruction stream at issue.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system capable of capturing data necessary for synthesizing an instruction stream comprising:
    a target computer system comprising:
        a microprocessor for which the instruction stream is to be synthesized;
        a main memory array coupled to said microprocessor; and
        a data capture device coupled to said main memory array and adapted to capture input/output (I/O) transactions and direct memory access (DMA) transactions to said main memory array; and
    a control computer system coupled to said target computer system;
    wherein said target computer system is adapted to capture branch trace data sufficient to reconstruct the instruction stream, and wherein said control computer system is adapted to control program execution in said target system and to selectively download branch trace data, main memory array images, captured I/O transactions, and captured DMA transactions from said target computer system.

2. The system as defined in claim 1 wherein the target computer further comprises:
    a host bridge device coupled between said microprocessor and said main memory array;
    a second bridge device coupled to said host bridge device via a primary expansion bus; and
    a synthesis control card coupled to said second bridge device, said synthesis control card adapted to control data capture and facilitate data transfer; and
        wherein said data capture device is coupled to said primary expansion bus, and
        wherein said microprocessor is adapted to write branch trace data to said main memory.

3. The target computer system as defined in claim 1 wherein said data capture device further comprises a logic analyzer.

4. The system as defined in claim 3 wherein said control computer couples to said target computer by way of said synthesis control card.

5. The system as defined in claim 1, wherein said control computer system is configured to cause a system management interrupt (SMI) to be sent to said microprocessor.

6. The system as defined in claim 5, wherein said target computer system is configured to transfer branch trace data to said control computer system in response to said system management interrupt.

7. The system as defined in claim 1, wherein said data capture device is configured to cause a system management interrupt (SMI) to be sent to said microprocessor.

8. The system as defined in claim 1, wherein a portion of said main memory array is configured as a shift register, wherein said shift register is operable to store an asserted state when said microprocessor makes a conditional jump, and wherein said shift register is operable to store a non-asserted state when said microprocessor does not make a conditional jump.

9. The system as defined in claim 1, wherein a portion of said main memory array is configured as a buffer, wherein said buffer is operable to store a value of the code segment (CS) and extended instruction pointer (EIP) with each serviced interrupt, and wherein said buffer is operable to store the target location of each indirect jump.

10. A method of recreating an instruction stream for a microprocessor comprising:
    writing branch trace data to buffers;
    capturing system memory images;
    capturing processor internal registers;
    capturing input/output (I/O) reads and writes;
    capturing direct memory access (DMA) transactions; and
    recreating an instruction stream executed by a microprocessor using said branch trace data, captured I/O reads and writes, and said captured DMA transactions.

11. The method as defined in claim 10, further comprising:
  receiving a system management interrupt (SMI); and
  transferring said branch trace data, said captured I/O reads and writes, and said captured DMA transactions to a control computer system in response to receiving said system management interrupt.

12. The method as defined in claim 11, wherein said transferring further comprises coupling a synthesis control card to an expansion bus of a computer system in which said microprocessor operates, wherein said synthesis control card is adapted to control data capture and facilitate data transfer.

13. The method as defined in claim 10 wherein writing branch trace data further comprises:
  placing an asserting state in a shift register when said microprocessor makes a conditional jump;
  placing a non-asserted state in said shift register when said microprocessor does not make a conditional jump;
  writing the value of the code segment (CS) and extended instruction pointer (EIP) register to a buffer with each serviced interrupt; and
  writing the target location of each indirect jump to said buffer.

14. The method as defined in claim 10 wherein said capturing said I/O reads, and capturing said DMA transactions further comprises coupling a data capture device to a primary expansion bus of a computer system in which said microprocessor operates, said data capture device further adapted to monitor bus traffic on said primary expansion bus and make copies of each I/O transaction and DMA transaction.

15. The method as defined in claim 14 wherein said capturing said I/O transactions by coupling a data capture device further comprises coupling a logic analyzer to said primary expansion bus, said logic analyzer adapted to monitor bus traffic on said primary expansion bus and make copies of each I/O transaction and DMA transaction.

16. A microprocessor comprising:
  a control register; and
  said microprocessor adapted to selectively write branch trace data based on the state of said control register, said branch trace data comprising:
    whether said microprocessor makes a conditional jump;
    a value of each of the code segment (CS) and extended instruction pointer (EIP) registers on each serviced interrupt; and
    a target location of each indirect jump.

17. The microprocessor as defined in claim 16, wherein said microprocessor is configured to execute instructions included in the x86 instruction set architecture.

18. The microprocessor as defined in claim 16, wherein writing branch trace data further comprises:
  placing an asserted state in a shift register when said microprocessor makes a conditional jump;
  placing a non-asserted state in said shift register when said microprocessor does not make a conditional jump;
  writing the value of the code segment (CS) and extended instruction pointer (EIP) register to a buffer with each serviced interrupt; and
  writing the target location of each indirect jump to said buffer.

19. The microprocessor as defined in claim 18, wherein said microprocessor is configured for coupling to a main memory array, wherein a first portion of said main memory array is configurable as said shift register, and wherein a second portion of said main memory array is configurable as said buffer.

20. The microprocessor as defined in claim 16, wherein said control register is configurable in response to said microprocessor receiving a system management interrupt (SMI).

* * * * *